(12) United States Patent
Esposito et al.

(10) Patent No.: US 8,719,713 B2
(45) Date of Patent: May 6, 2014

(54) RICH ENTITY FOR CONTEXTUALLY RELEVANT ADVERTISEMENTS

(75) Inventors: Mario Esposito, Redmond, WA (US); Ehr-Chun Yeh, Belleview, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 12/471,017

(22) Filed: Jun. 17, 2009

(65) Prior Publication Data
US 2010/0325542 A1    Dec. 23, 2010

(51) Int. Cl.
*G06F 3/00* (2006.01)
(52) U.S. Cl.
USPC .................................................. 715/760
(58) Field of Classification Search
USPC ............. 715/205–209, 230–233, 253, 256, 715/269–270, 273, 277, 705, 708, 711, 714, 715/715, 760, 790, 808, 809, 825; 705/14.4, 14.49–14.54, 14.66–14.67
See application file for complete search history.

(56) References Cited

U.S. PATENT DOCUMENTS

| | | | |
|---|---|---|---|
| 5,740,549 A * | 4/1998 | Reilly et al. | 705/14.42 |
| 5,815,830 A * | 9/1998 | Anthony | 707/758 |
| 5,826,025 A * | 10/1998 | Gramlich | 709/217 |
| 6,098,065 A * | 8/2000 | Skillen et al. | 707/722 |
| 6,122,647 A * | 9/2000 | Horowitz et al. | 715/205 |
| 6,144,944 A * | 11/2000 | Kurtzman et al. | 705/14.54 |
| 6,256,631 B1 * | 7/2001 | Malcolm | 1/1 |
| 6,581,065 B1 * | 6/2003 | Rodkin et al. | 1/1 |
| 6,862,710 B1 * | 3/2005 | Marchisio | 715/206 |
| 7,257,585 B2 * | 8/2007 | Stevenson et al. | 707/809 |
| 7,505,969 B2 | 3/2009 | Musgrove | |
| 7,593,965 B2 * | 9/2009 | Gabriel | 1/1 |
| 7,827,174 B2 * | 11/2010 | Henkin et al. | 707/726 |
| 2002/0143808 A1 * | 10/2002 | Miller et al. | 707/501.1 |
| 2002/0154163 A1 * | 10/2002 | Melchner | 345/749 |
| 2003/0079176 A1 * | 4/2003 | Kang et al. | 715/500 |
| 2004/0059708 A1 * | 3/2004 | Dean et al. | 707/1 |
| 2005/0149395 A1 * | 7/2005 | Henkin et al. | 705/14 |
| 2006/0242554 A1 * | 10/2006 | Gerace et al. | 715/501.1 |
| 2007/0073756 A1 * | 3/2007 | Manhas et al. | 707/101 |
| 2007/0156521 A1 * | 7/2007 | Yates | 705/14 |
| 2007/0157110 A1 * | 7/2007 | Gandhi et al. | 715/779 |

(Continued)

OTHER PUBLICATIONS

Oiaga, Marius, "Introducing Microsoft Gaze Beta"; Published Feb. 3, 2009 http://news.softpedia.com/news/Introducing-Microsoft-Gaze-Beta-103554.shtml; 2 pgs; Copyright 2001-2012 Softpedia. Last accessed: Feb. 17, 2012.

(Continued)

*Primary Examiner* — Enrique Iturralde
(74) *Attorney, Agent, or Firm* — John Dewey; Leonard Smith; Micky Minhas

(57) ABSTRACT

Described herein is an in-text advertising display that presents web advertisements contextually related to retrieved web content about text on a web page. The text of a web page is analyzed to determine whether terms or phrases are associated with particular contextual definitions called entities. Portions of text associated with an entity are emphasized to the user. Detection of a user trigger event initiates retrieval of additional web content about the emphasized text and the retrieved additional content is displayed in a display window, within a pop-up advertisement, or within a quickbar window. An adjacent seamless window displaying web advertisements related to the additional web content is also presented to the user.

20 Claims, 11 Drawing Sheets

(56) References Cited

U.S. PATENT DOCUMENTS

| | | | |
|---|---|---|---|
| 2008/0046415 A1* | 2/2008 | Henkin et al. | 707/3 |
| 2008/0071612 A1 | 3/2008 | Mah | |
| 2008/0086356 A1 | 4/2008 | Glassman | |
| 2008/0140728 A1 | 6/2008 | Fraser | |
| 2008/0306999 A1 | 12/2008 | Finger | |
| 2009/0006375 A1 | 1/2009 | Lax | |
| 2009/0013347 A1 | 1/2009 | Ahanger | |
| 2009/0018920 A1* | 1/2009 | Lerman et al. | 705/14 |
| 2009/0070190 A1 | 3/2009 | Gorty | |
| 2009/0076886 A1 | 3/2009 | Dulitz | |
| 2009/0076916 A1 | 3/2009 | Kim | |
| 2009/0164949 A1* | 6/2009 | Henkin et al. | 715/862 |
| 2010/0138452 A1* | 6/2010 | Henkin et al. | 707/803 |
| 2010/0241507 A1* | 9/2010 | Quinn et al. | 705/14.42 |
| 2010/0299200 A1* | 11/2010 | Delli Santi et al. | 705/14.49 |

OTHER PUBLICATIONS

"Contextual Advertising Technology" by Kontera; http://www.kontera.com/contextual-advertising-technology/overview/; 2 pgs; Copyright Kontera 2008. Last accessed: Mar. 25, 2009.

"In-Text Advertising Guidelines and Standards"; http://www.vibrantmedia.com/webpublishers/guidelines_standards.asp; 2 pgs; Copyright 2009. Last accessed: Mar. 25, 2009.

"In-Text Advertising"; http://en.wikipedia.org/wiki/In-text_advertising; 1 pg; Wikipedia. Last accessed: Mar. 25, 2009.

* cited by examiner

RICH ENTITY FOR CONTEXTUALLY RELEVANT ADVERTISEMENTS

BACKGROUND

As the Web becomes an increasingly popular medium for advertisers, web pages are being cluttered with disjointed web advertisements. Users viewing web pages are often inundated with advertisements that are not relevant to the content in the web pages or not related to the underlying meaning of words in the web pages' text. For instance, a web page detailing information about the celebrity Paris Hilton (a celebrity) may contain advertisements for trips to the city of Paris or nights at a particular hotel. Bombarding users with poorly chosen advertisements generally results in a frustrating experience for the users and fewer selections of advertisements.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to displaying user-interactive web content associated with text on a web page. In this embodiment, an entity database storing entity definitions associated with text phrases is accessed to determine if a portion of text on the web page is associated with an entity definition. If so, the portion of text is emphasized and subsequent user trigger events will initiate the display of additional web content in a display window and related web advertisements in a seamless second window. The web advertisements may change whenever the user opts to view different types of additional web content in the display window.

Another aspect is directed to a user interface (UI) display that presents additional web content about a portion of text on a web page and seamlessly presents web advertisements that correlate to the underlying contextual meaning of some of the additional web content. The additional web content may be organized according to type of content (e.g., audio, video, and news). Also, the web advertisements may change based on the additional web content is being displayed.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
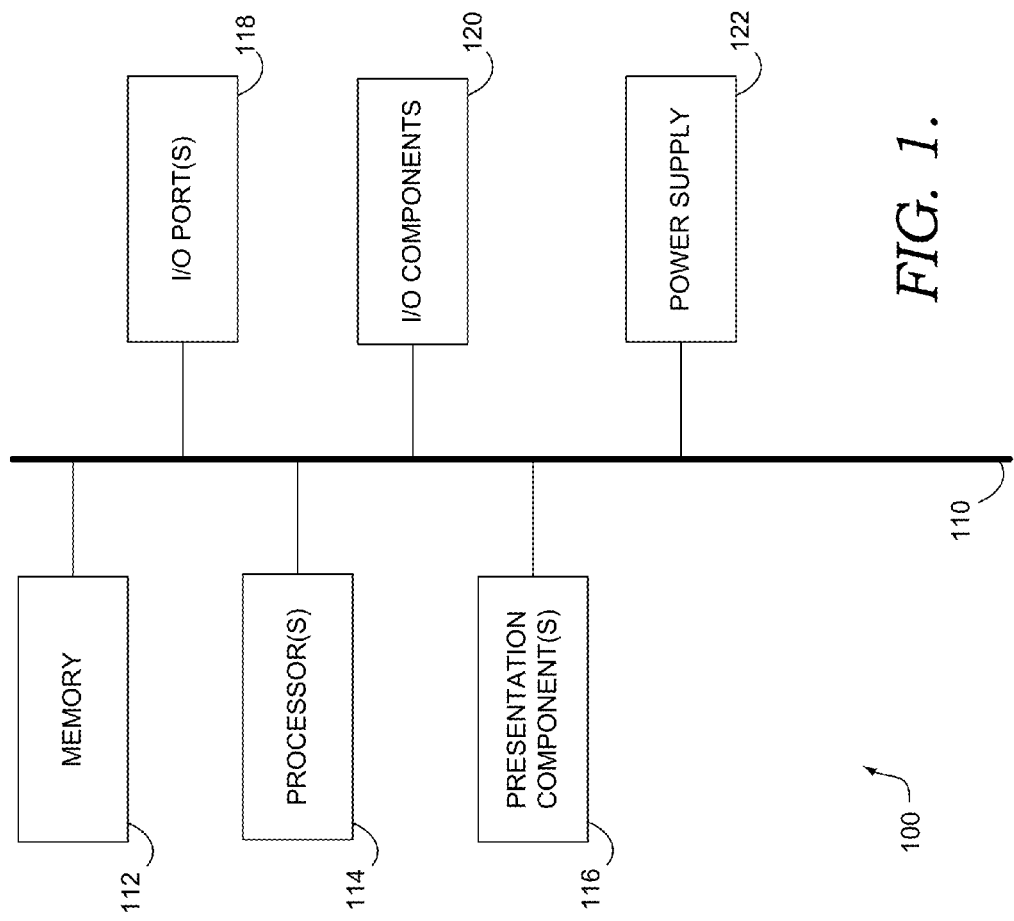
FIG. 1 is a block diagram of an exemplary computing device, according to one embodiment.

The subject matter described herein is presented with specificity to meet statutory requirements. The description herein is not intended, however, to limit the scope of this patent. Instead, the claimed subject matter may also be embodied in other ways, to include different steps or combinations of steps similar to the ones described in this document, in conjunction with other present or future technologies.

In general, embodiments described herein are directed to displaying web advertisements so publishers of web pages can leverage the content of their web pages to optimize web advertising. Specifically, web advertisements are selectively displayed on a web page based on the underlying meaning (or "contextual relevance") of identified groups of words within the web page. In one embodiment, the text of a web page is parsed to determine whether the text contains any words or phrases associated with a particular contextual meaning, and if so, the words or phrases are converted into links that provide a path to additional web content. The linked text may be visually emphasized (e.g., underlined, highlighted, etc.) and configured to display the additional web content and/or the web advertisement after a triggering event (e.g., mouse click, mouse hover, etc.).

An example will provide some high-level clarity to some of the embodiments discussed below. Suppose a web publisher creates a web page. In one embodiment, all the text on the web page is parsed to determine whether the text contains a particular type of contextually relevant text, like celebrity names. Each celebrity name on the web page may be converted into a link to additional web content about the given celebrity. When a user viewing the web page performs a triggering event on emphasized text, multiple UI windows may be displayed in a visually seamless fashion. One window, referred to in this example as the "web content window" displays the additional web content related to the linked celebrity name and options for viewing the additional web content. Another window, called the "advertisement window," displays various web advertisements related the celebrity name and the additional web content being viewed in the web content window. Additionally, web advertisements may be selectively displayed in the advertisement window based, in part, on the user's preferences or history. This example is provided merely to describe one example embodiment and is not necessarily meant to apply to all embodiments.

Before proceeding further, some terms should initially be defined. The terms "web advertisement," "entity," "web service," "seamless window," and "additional web content" are described below for a better understanding of the embodiments mentioned herein. These definitions are provided for guidance in navigating through the discussions below; however, one skilled in the art may understand various other meanings associated with these terms. For example, the term "web service" may imply many additional software and hardware components not described herein to one skilled in the art. As such, the definitions provided below are not all encompassing but instead supplement the understanding of these terms to one skilled in the art.

A web advertisement refers to an online advertisement presented on a web page. A web advertisement, while seemingly presented as a single file, may in fact include various image, text, audio, video, or other data files pulled from different online sources. The embodiments described herein mention web advertisements as displayable impressions of advertising.

An entity refers to the underlying context associated with one or more terms on a web page. Often, web pages are crawled to identify the terms and phrases within their web content, and the terms and phrases are analyzed to understand their contextual meaning. In particular, entities refer to classifications of the underlying contextual meaning of terms and phrases, which may be dictated by cultural, societal, demographic, or other norms. For example, terms that together constitute the name of a celebrity may be assigned to an entity indicating the terms a celebrity classification. In another example, a word displayed in a certain geographic location, such as "SEAHAWKS" in the state of Washington, may be assigned to a sports entity. Whereas, Seahawks in a different part of the country—such as South Carolina—may be assigned to an entity associated with birds. Multiple entities may be used to properly classify the meaning of text on the Web. In one embodiment, an entity is stored in a database as an "entity definition" with various relationships to different terms or phrases. An entity definition is simply a representation of the contextual meaning assigned to an entity.

Web services, as described herein, refer to software designed to support interoperable machine-to-machine interaction over a network. In one embodiment, a web service is an application programming interface (API) executing on a server and accessible to a remote computing device. Web services may include, for example, server-based applications configured to search a database, locate web advertisements, retrieve audio files, or the like. The list of existing and possible web services is virtually infinite, many of which are well known to those skilled in the art.

Web services typically use a client-server relationship to communicate computations of a server (or remote computing device) to a client computing device. This type of computing is commonly referred to as "in-the-cloud" computing. To support web services, servers may be configured with a server-based operating system (e.g., Microsoft Windows Server®), server-based database software (e.g., Microsoft SQL Server®), or other server-based software.

Web services may communicate documents, such as extensible markup language (XML) or hypertext markup language (HTML) documents, containing various forms of data using the simple object access protocol (SOAP). For example, a web service that publishes and manages web pages may need to communicate the HTML documents associated with the web page. Moreover, a web service that locates text in web content referring to entities may query a database server to determine whether words or phrases parsed from the web content have previously been associated with an entity.

A "seamless window" is a UI window displayed within a web browser. In one embodiment, seamless windows are used to present web advertisements in a visually congruent manner with another UI displaying additional web content about an entity on the web page. Seamless windows may match the color, theme, font, animation, color pattern, color fade, or other characteristic of the additional web content. In effect, visually seamless windows appear as a mere extension of the UI window populated with additional web content. In one embodiment, a web advertisement in a seamless window is contextually relevant to the additional web content. For example, if the additional web content includes a news story about a particular type of product, the seamless window may be populated with the product or a competitor of the product.

Additional web content, as used to herein, refers to web content not found on the web page. Examples include, without limitation, online videos, audio, images, news, images, products, or other web content.

In one embodiment, a quickbar UI may be used to present the additional web content when text is associated with an entity. A quick bar, as referred to herein, is a miniature UI window showing a mini preview of the most popular additional web content for a given entity. For example, a celebrity name may initiate a quickbar displaying photographs or news headlines because celebrity photography and news is quite popular. Or, in another example, a musician may initiate a quickbar loaded with previews of the musician's discography. The quickbar may be displayed within close proximity to the text associated with the entity. In one embodiment, no advertisements are shown with the quickbar so the quickbar can be presented in a small window. The user may optionally dismiss the mini preview in the quickbar. In another example, when the user clicks the quickbar more frequently, another icon may be shown that, when selected, presents the additional content window, which is described in more detail below. As the user smoothly transitions to the additional content window, the mini preview quickbar may be configured to disappear leaving only the additional content window.

Embodiments mentioned herein may take the form of a computer-program product that includes computer-useable instructions embodied on one or more computer-readable media. Computer-readable media include both volatile and nonvolatile media, removable and nonremovable media, and contemplates media readable by a database. The various computing devices, application servers, and database servers described herein each may contain different types of computer-readable media to store instructions and data. Additionally, these devices may also be configured with various applications and operating systems.

By way of example and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently.

Having briefly described a general overview of the embodiments described herein, an exemplary operating environment is described below. Referring initially to FIG. 1 in particular, an exemplary operating environment for implementing one embodiment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

Embodiments may be described in the general context of computer code or machine-useable instructions, including computer-executable instructions such as program modules, being executed by a computer or other machine, such as a PDA or other handheld device. Generally, machine-useable instructions define various software routines, programs, objects, components, data structures, remote procedure calls (RPCs), and the like. In operation, these instructions perform particular computational tasks, such as requesting and retrieving information stored on a remote computing device or server.

Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
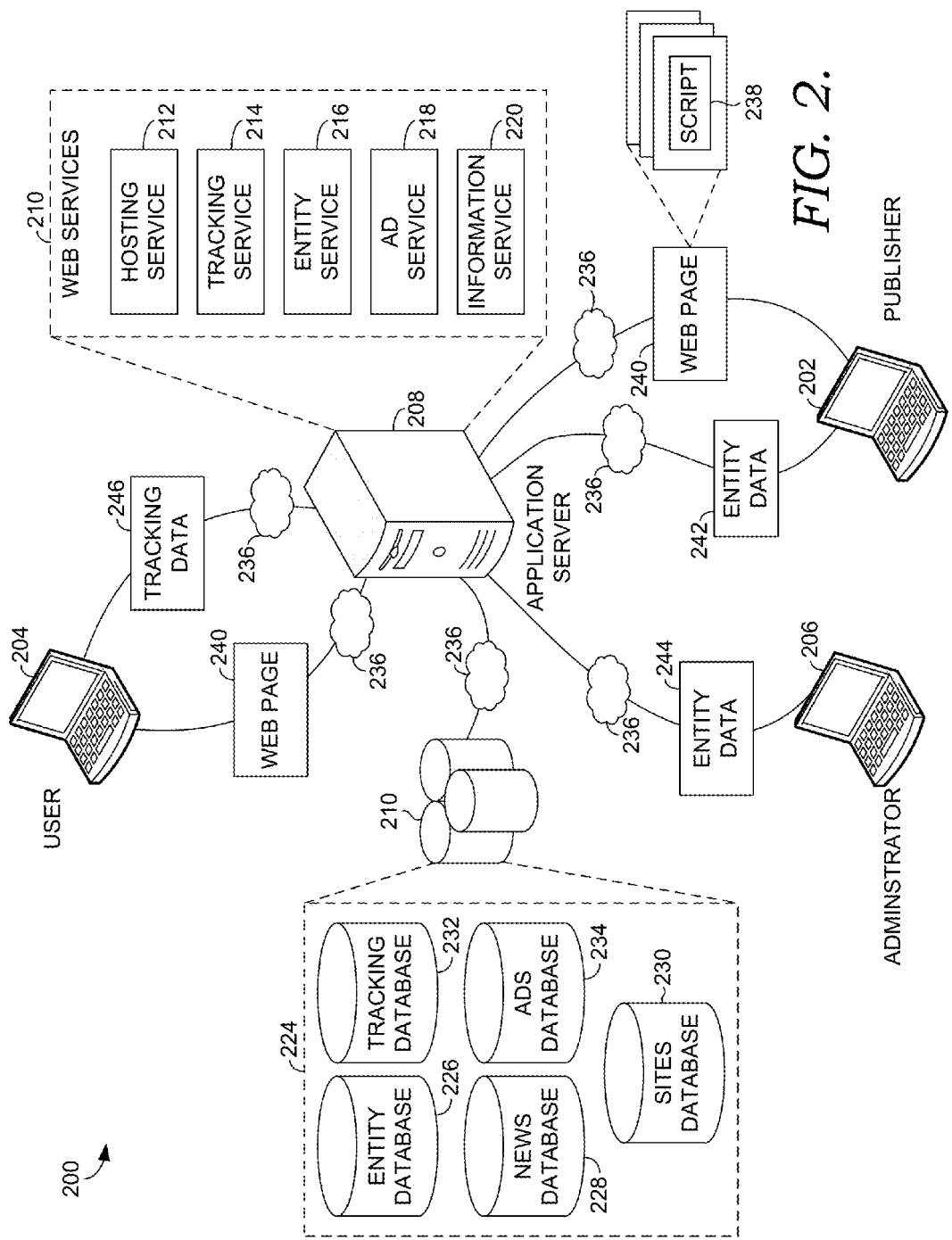
FIG. 2 is a diagram of a networked environment for displaying web advertisements that are contextually relevant to identified entities, according to one embodiment.

FIG. 2 is a diagram of a network environment for displaying web advertisements that are contextually relevant to identified entities, according to one embodiment. The network environment, referenced as 200, includes several computing devices and software modules communicating across a network. Specifically, several client computing devices 202, 204, and 206 communicate with application server 208 and/or database cluster 210.

Client computing devices 202, 204, and 206 may be any type of computing device, such as the device 100 described above with reference to FIG. 1. By way of example only but not limitation, client computing devices 202, 204, and 206 may be a personal computer, desktop computer, laptop computer, handheld device, mobile phone, PDA, or other personal computing device.

To further illustrate different embodiments, computing devices 202, 204, and 206 are shown from the perspective of a publisher, user, and administrator, respectively. A "publisher" is a designer, operator, or editor of a web page with rights to publish or manipulate that content on the web page. An example of a publisher is the owner of a web blog. A "user" refers to a web server or person attempting to access a web page. An "administrator," as used herein, is an individual with rights to edit, manipulate, add, or delete entity data as described below.

Application server 208 represents a server or servers configured to perform different web services. Application server 208 may include an actual application server or file server. Components of the application server 208 may include a processing unit and computer-readable media with server-based applications embodied thereon. While application server 208 is illustrated as a single box, one skilled in the art will appreciate that the application server 208 may be scalable. For instance, application server 208 may actually include multiple servers operating various portions of the web services described below, or alternatively, application server 208 may act as a broker or proxy for various web services. As indicated in the expanded view of application 208, multiple web services 210 are executed by application server 208.

Database cluster 210 represents a collection of database servers 224 that are configured to store various types of data. One skilled in the art will appreciate that each database server (226, 228, 230, 232, and 234) includes a processing unit, computer-readable media, and database-server software. Database-server software may include any well-known database application coded in a database computer language, such as Microsoft SQL Server®. One skilled in the art will appreciate that applications developed in database computer languages are typically designed for the management of data in relational database management systems (or "RDBMS").

Communication between client computing devices 202-206, application server 208, and database cluster 210 is conducted across network 236. Network 236 may include any computer network or combination thereof. Examples of computer networks configurable to operate as network 236 include, without limitation, a wireless network, landline, cable line, fiber-optic line, local area network (LAN), wide area network (WAN), or the like. In an embodiment where network 236 comprises a LAN networking environment, components are connected to the LAN through a network interface or adaptor in an embodiment where network 236 provides a LAN networking environment, components used a modem, or other means for establishing communications over the WAN, to communicate. Network 236 is not limited, however, to connections coupling separate computer units. Instead, network 236 may also include subsystems that transfer data between servers computing devices. For example, network 236 may include a point-to-point connection as well as the Internet. Computer networks should be well known to one skilled in the art, and therefore does not need to be discussed at length herein.

In one embodiment, the publisher embeds a script 238 within a web page 240. When rendered by a web browser, script 238 provides instructions for identifying what text the publisher wishes to analyze for entities. Script 238 is coded in a scripting language like JavaScript, VBScript, or the like. The following is a JavaScript example of script 238 that could be added to the head block of web page 240.

```
<script type = "text/javascript"
        src=//gaze.live.net/GazeScript.js"></script>
```

In the same example, the text of web page 24 may be wrapped with the following div block.

```
<div id="D033697cdd5dd5b2d4eec828299f97ba30cf2">
        Madonna is a great artist!
</div>
```

The above code is merely an example, as various script coding techniques may be used to perform a similar function.

In one embodiment, script 238, when executed by a web browser plug-in (e.g., Microsoft SilverLight™ or Adobe Flash) provides access to the entity service 216 and communicates the text identified by the div block (or like script indication). Upon receipt of the identified text, the entity service 216 parses the wrapped text into individual terms and accesses the entity database 226 to determine whether the terms are associated with any entities. If so, the entity service 216, in one embodiment, emphasizes the entity-associated terms in web page 240—e.g., by underlining, bolding, italicizing, animating, highlighting, or providing some other visually perceptible emphasis. Whereupon, the user viewing web page 240 on client computing device 204 will see an emphasized rendition of the entity-associated text in the web content.

Once text is emphasized, a detected trigger event may induce the presentation of a UI window displaying additional web content (referred to hereafter as "the additional content window"). Trigger events may be performed any number of ways, such as by a mouse hover, mouse click, toolbar selection, or selection of keys. In one embodiment, a miniature toolbar of options described below is presented whenever the user hovers a mouse cursor over emphasized text.

Multiple options for viewing the web content may also be presented to the user in the additional content window. Icons can be displayed giving the user options to view news, highlights, profile data, videos, and images or listen to audio that is contextually relevant to the text and the identified entity associated therewith. When an icon is selected, the options and the icons in the additional content window are illustrated, as shown in FIGS. 4B-4H and described in greater detail below.

Entity extraction may be influenced by entity data 242 and 244 submitted by the publisher and administrator, respectively. In addition, the entities may be selected based, in part, on tracking data 244 from the user. Tracking data 244 is data indicating a user's web-search history, content preferences, and/or viewing preferences. Tracking data 244 may be retrieved from cookies, online profile information, web history, or historical UI-viewer selections transmitted to tracking service 214. In particular, historical UI-viewer selections are tracked icon selections previously selected by the user.

In operation, application server 208 supports web services 210, which include hosting service 212, tracking service 214, entity service 216, ad service 218, and information service 220. Hosting service 212 handles publication of web page 240 and stores web page 240 in sites database 230. Tracking service 214 receives tracking data 244 from the user and stores tracking data 246 in tracking database 232. Entity service 216 handles parsing the text of web page 240 designated by script 238 and identifying entities in the entity database 226 related to the parsed text.

Additional web content is retrieved by information service 220, which is configured to find different types of web content. In one embodiment, information service 220 contacts a search engine (e.g., MSN® or Windows Live™) to retrieve the additional web content associated with text upon which a trigger event was detected.

In one embodiment, entity service 216 communicates the identified text to be emphasized to client computing device 204. Information service 220 retrieves additional web content about entity-associated text from database 228. As previously mentioned, additional web content may include audio, video, news, headlines, profile data, or the like and is eventually passed to client computing device 202.

Entity service 216 parses the web content of web page 240 for known entities indicated in entity database 226. Entity database 226 stores associations of text terms or phrases with entity definitions. For example, the name "Madonna" may be associated in the entity database 226 with the entity definition "celebrity." In one embodiment, the administrator submits entity data 244 to the entity database 226 to define the relationships between entity definitions and terms. For example, the administrator may specify that "Paris Hilton" is associated with a celebrity.

Alternatively, entity data 244 may indicate what entities are to be assigned to what types of web advertisements. The administrator may also filter web advertisements for display based on geographic areas, user age, user gender, user history (as identified by shared cookies, user-profile data, or user search history), and so forth. For example, entities associated with celebrities may be set to trigger impressions of web advertisements about different dress makers to women of certain age group in a particular geographic area because a highly publicized red-carpet event will take place in that geographic area.

The publisher can also specify entity data (indicated as entity data 242) relevant to the publisher. This allows the publisher to limit the web advertisements being displayed on top of the web page 240 to a particular entity. Doing so is useful when the publisher has data indicating monetary effectiveness (e.g., high click-thru rate) of certain kinds of web advertisements. For example, the publisher may specify, in the entity data 242, that only web advertisements relating to certain entities (e.g., celebrities) or combinations of entities (e.g., celebrities+sports) are to be displayed on web page 240.

Ad service 218 selects web advertisements for the emphasized text from ads database 234. When selecting web advertisements, ad service 218 may consider additional other inputs to select appropriate web advertisements. For instance, ad service 218 may use entity data 242 and 244 from the publisher or administrator, respectively. Ad service may use tracking data 246 from the user. Ad service may receive an indication of what the user is currently viewing in the additional content window. For example, when the user views a news headline mentioning a particular vehicle, ad service 218 can select a web advertisement about the vehicle. In this scenario, ad service 218 uses the underlying contextual relevance of the news headline to select a web advertisement. This same principle can be applied to other types of web content, such as audio, video, etc.

Moreover, entity service 218 may switch web advertisements being displayed based on what the user is viewing in the additional content window. When the user cycles through the additional web content, the ad service 218 selects a different web advertisement related to what the user is currently viewing. For example, if the UI window is displaying news events and one of the news items is about a particular vehicle, the ad service 218 can initially select a web advertisement for the vehicle. If the user then begins to view images associated with the entity-associated text, the ad service 218 can select a web advertisement for a particular dress in one of the images.

Figure 3:
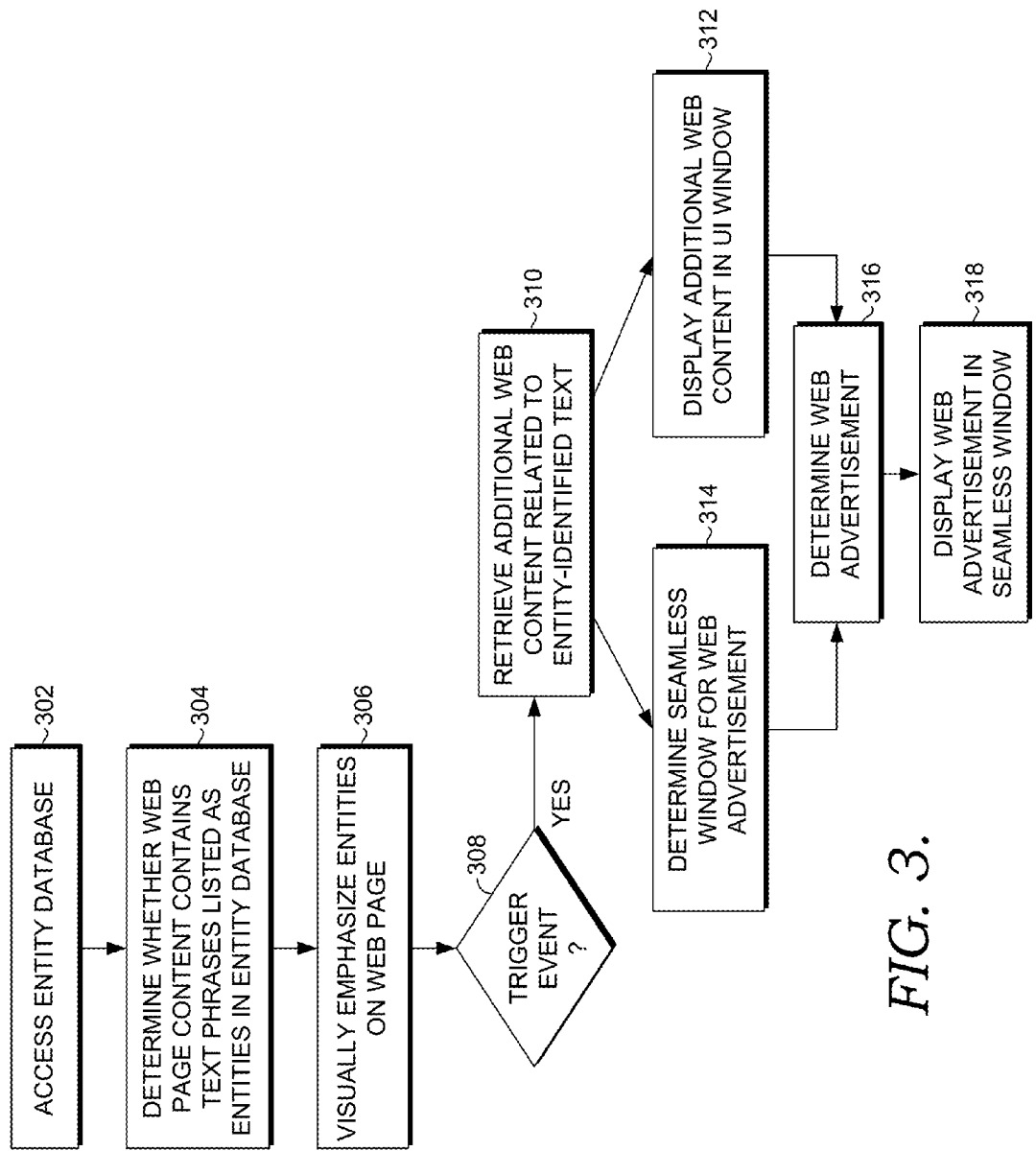
FIG. 3 is a flow chart diagram for displaying in-text web advertisements that are contextually relevant to identified entities, according to one embodiment.

FIG. 3 is a flow chart diagram for displaying web advertisements that are contextually relevant to identified entities, according to one embodiment. When a publisher publishes a web page, script in the web page identifies a web service to parse the content of the web page. The web service identifies terms and phrases in the content and accesses an entity database (indicated at 302) to determine whether the parsed text maps to any entities in the entity database (indicated at 304). In other words, the web service queries the entity database to determine if any words are associated with any entities.

When found, text related to an entity is emphasized on the web page, as indicated at 306. Emphasis may be indicated through underlining, highlighting, animating, or otherwise visually identifying the identified text. The user can trigger the display of an additional content window populated with additional web content. If a triggering event is recognized, as indicated at 308, additional web content related to the identified text is retrieved, as indicated at 310. In one embodiment, the additional web content is contextually related to the entity and the identified text. For example, if the identified text is "Madonna" and the entity is "celebrity," the additional web content would be related to the celebrity named Madonna. As indicated at 312, the additional web content is displayed in an additional content window, such as an overlay window rendered over the web page.

A seamless window for a web advertisement is determined, as indicated at 314. The seamless window, in one embodiment, matches the visual look of the in-text overlay window to perceptively appear as an extension of the additional content window. A web advertisement is selected, as indicated at 316, and displayed in the seamless window, as indicated at 318.

Figure 4A:
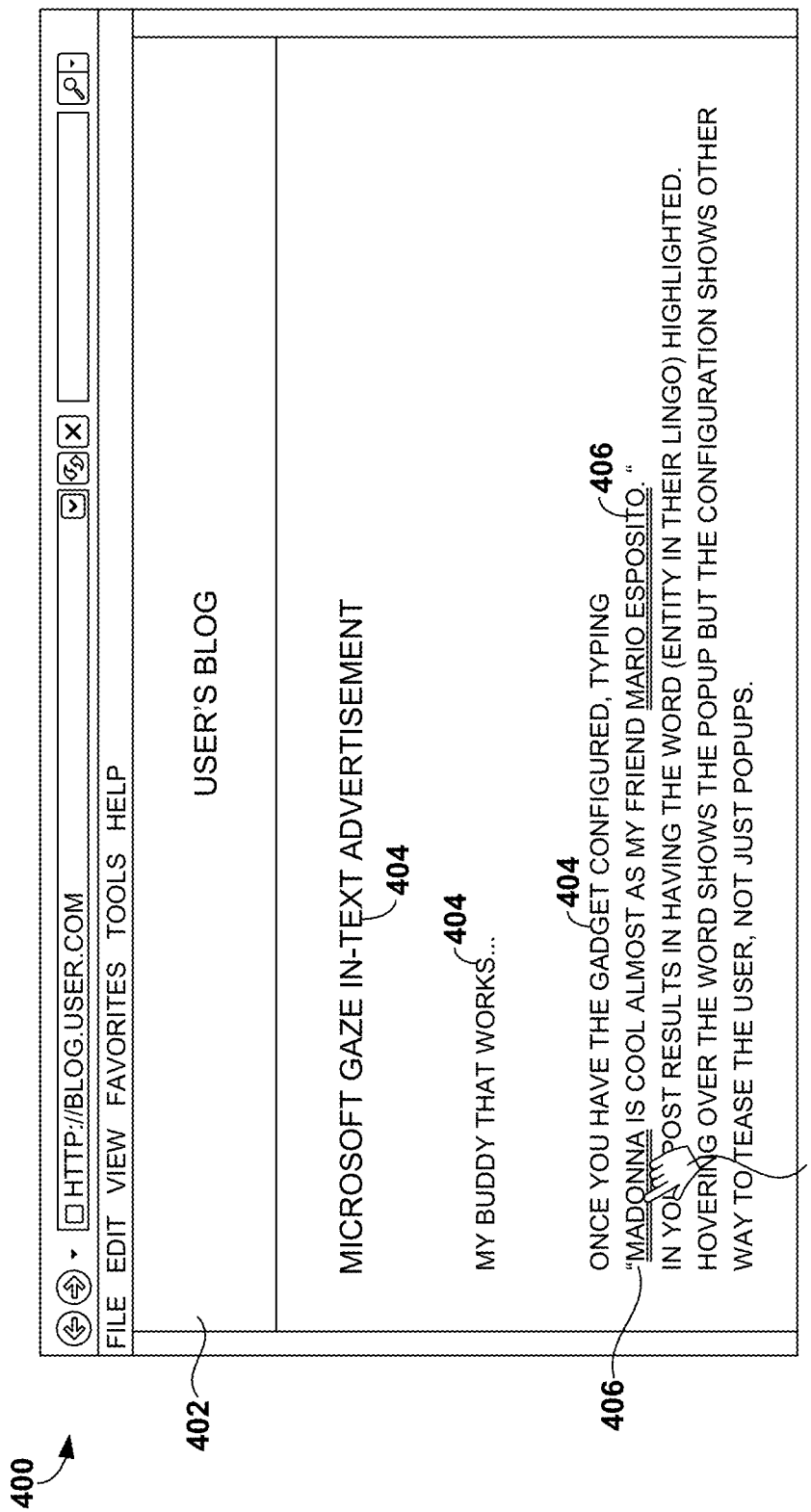
FIGS. 4A-4H are diagrams of user interfaces for displaying in-text web advertisements that are contextually relevant to identified entities, according to one embodiment.

FIGS. 4A-4H are diagrams of UIs for displaying web advertisements that are contextually relevant to identified entities, according to one embodiment. Turning initially to FIG. 4A, a web browser window 400 is shown displaying a web page 402. The content 404 of the web page includes numerous lines of text. Two portions of the text are emphasized, the names "MADONNA" and "MARIO ESPOSITO." The emphasized text 406 identifies terms associated with entities. A user can direct mouse cursor 408 to the emphasized text 406 to initiate a trigger event.

Figure 4B:
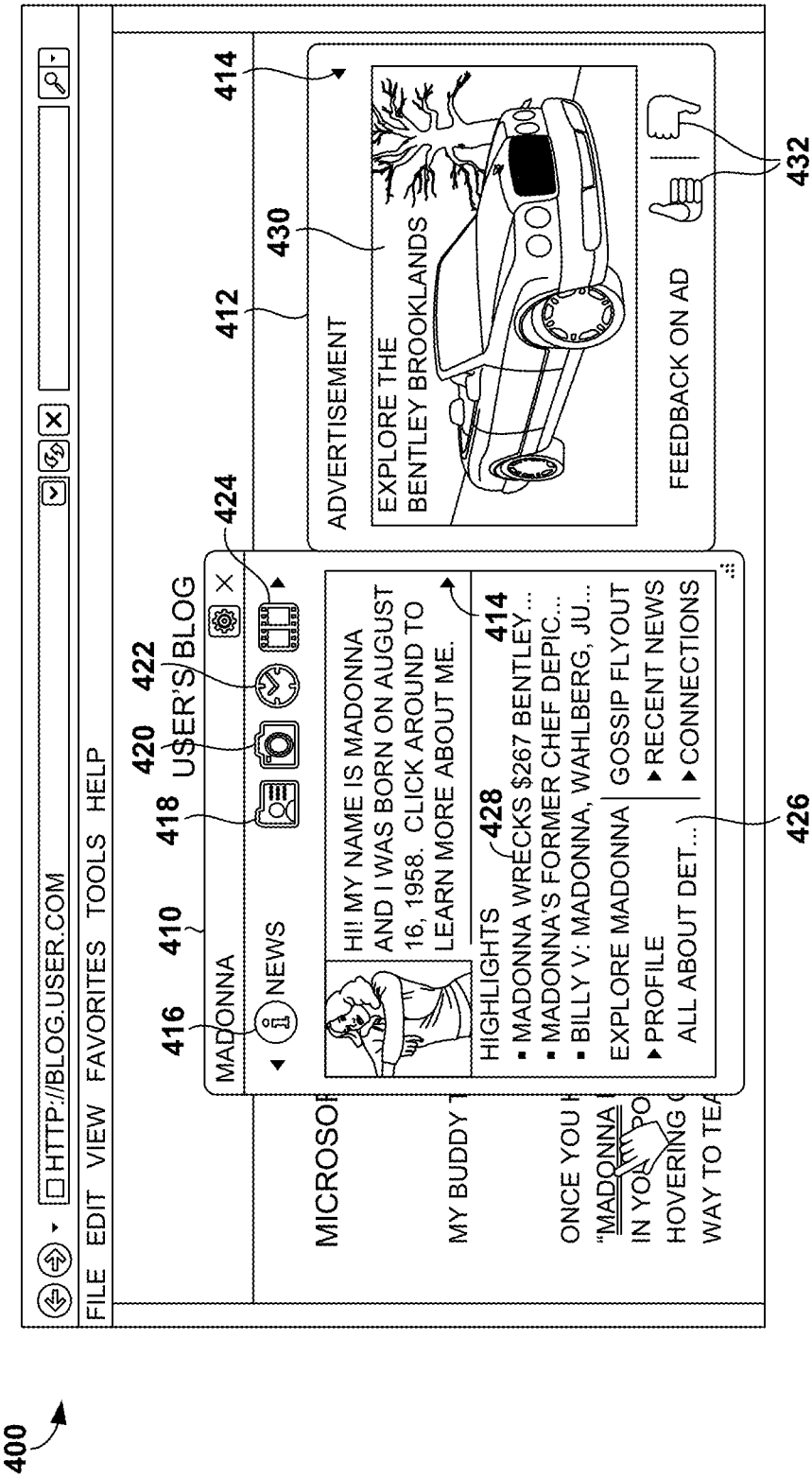

FIG. 4B illustrates a display after a trigger event is detected. A first UI display 410 is presented as an overlay UI window on top of content 404. Additionally, a second UI display 412 is presented in a seamless window. The first UI display depicts different options for viewing additional web content retrieved about the text 406 that the triggering event was performed on. These options are illustrated as news icon 416, folder icon 418, camera icon 420, timeline icon 422, film icon 424, and headphones icon 440 (shown in FIG. 4B). Selection of different icons indicate different types of additional web content in the first UI display 410. In one embodiment, the additional web content displayed in the first UI determines which web advertisement 430 to display in the second UI display 412. Moreover, controls 414 allow the user to open and close the second UI display 412.

Because news icon 416 was selected by the user, or defaulted to when opening the first UI window 410, online news 426 is listed. The news 426 may be refreshed by a web service—like information service 220 described above—to keep news fresh. As illustrated, the underlying context a of news story 428 is used to select web advertisement 430. News story 428 describes a vehicle (i.e., a Bentley), and the web advertisement 430 advertises that vehicle. The user may provide feedback about web advertisement 430 using icons 432. The feedback can be sent as tracking data for use in selecting web advertisements in the future.

Figure 4C:
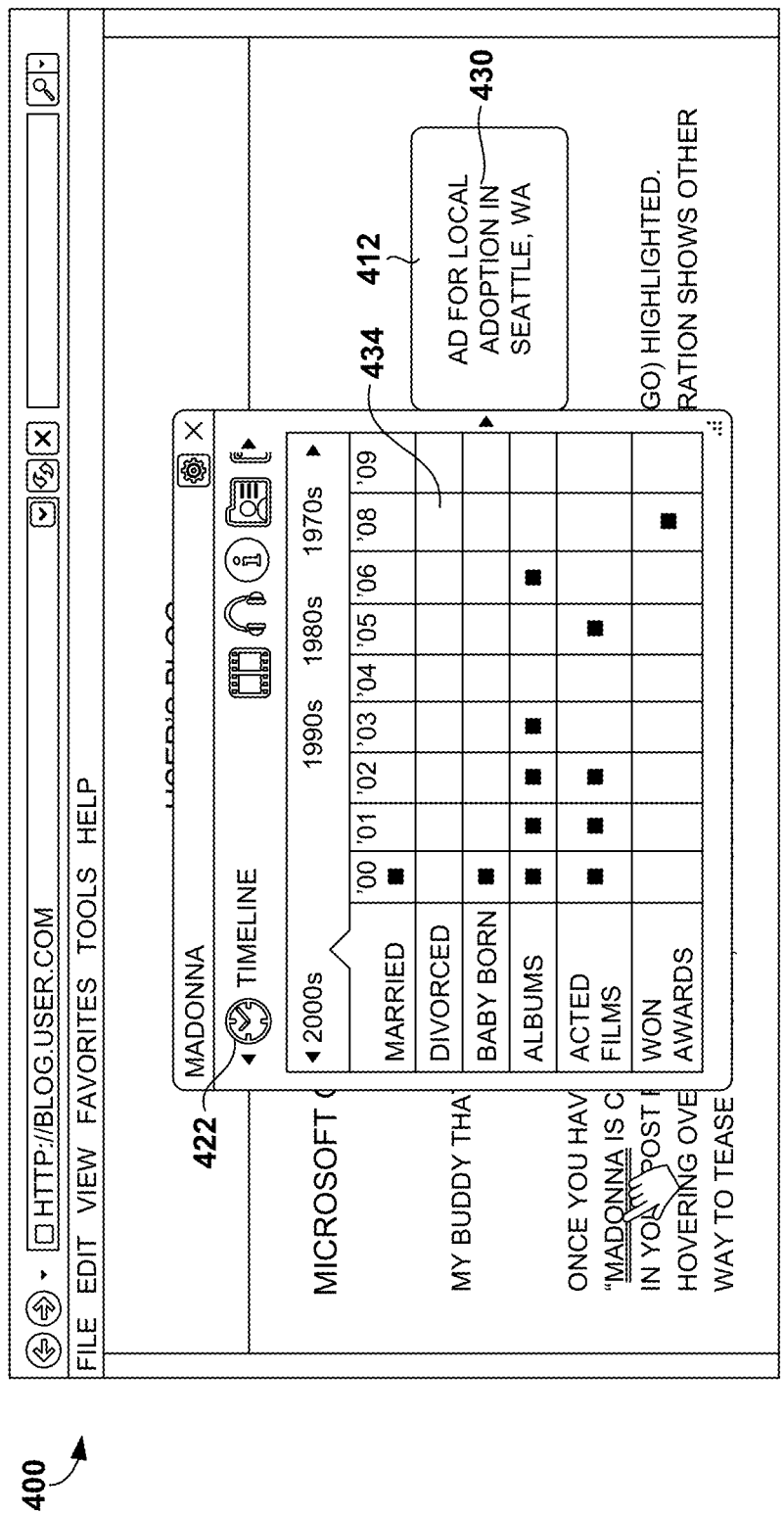

In FIG. 4C, the timeline icon 422 was selected. Consequently, a historical summary 434 is displayed showing various important days in Madonna's life. The historical summary 434 is used to select web advertisement 430, which has switched from an advertisement about a Bentley to an advertisement about adoption in a geographic region where the user resides.

Figure 4D:
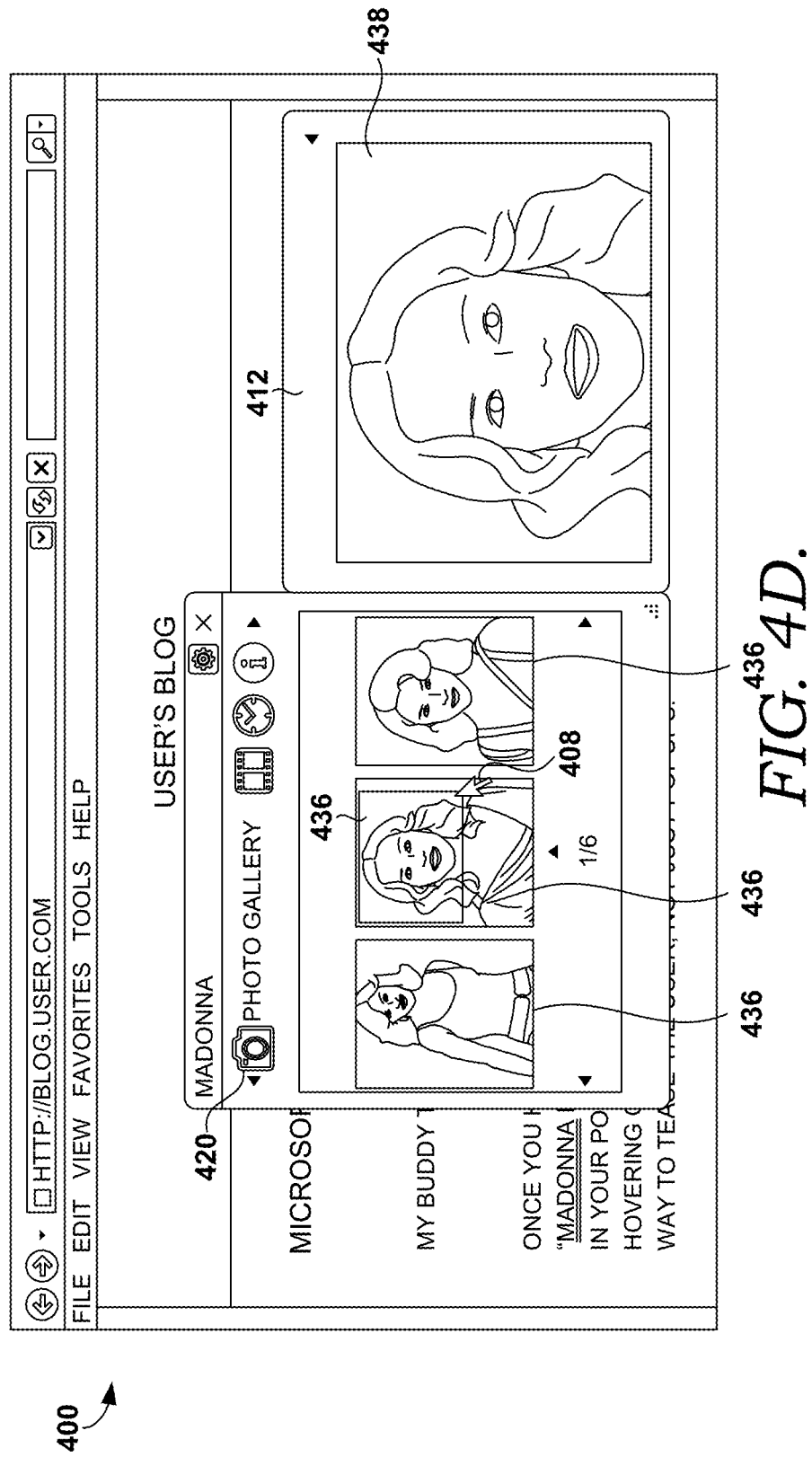

In FIG. 4D, the camera icon 420 was selected, prompting images 436 about Madonna to be displayed. The user may move the mouse cursor 408 over one of the images 436 to zoom in on a particular image. A zoom window 436 shows the user what portion of the chosen image is being zoomed and contemporaneously shown in the second UI display 412 as zoomed image 438.

Figure 4E:
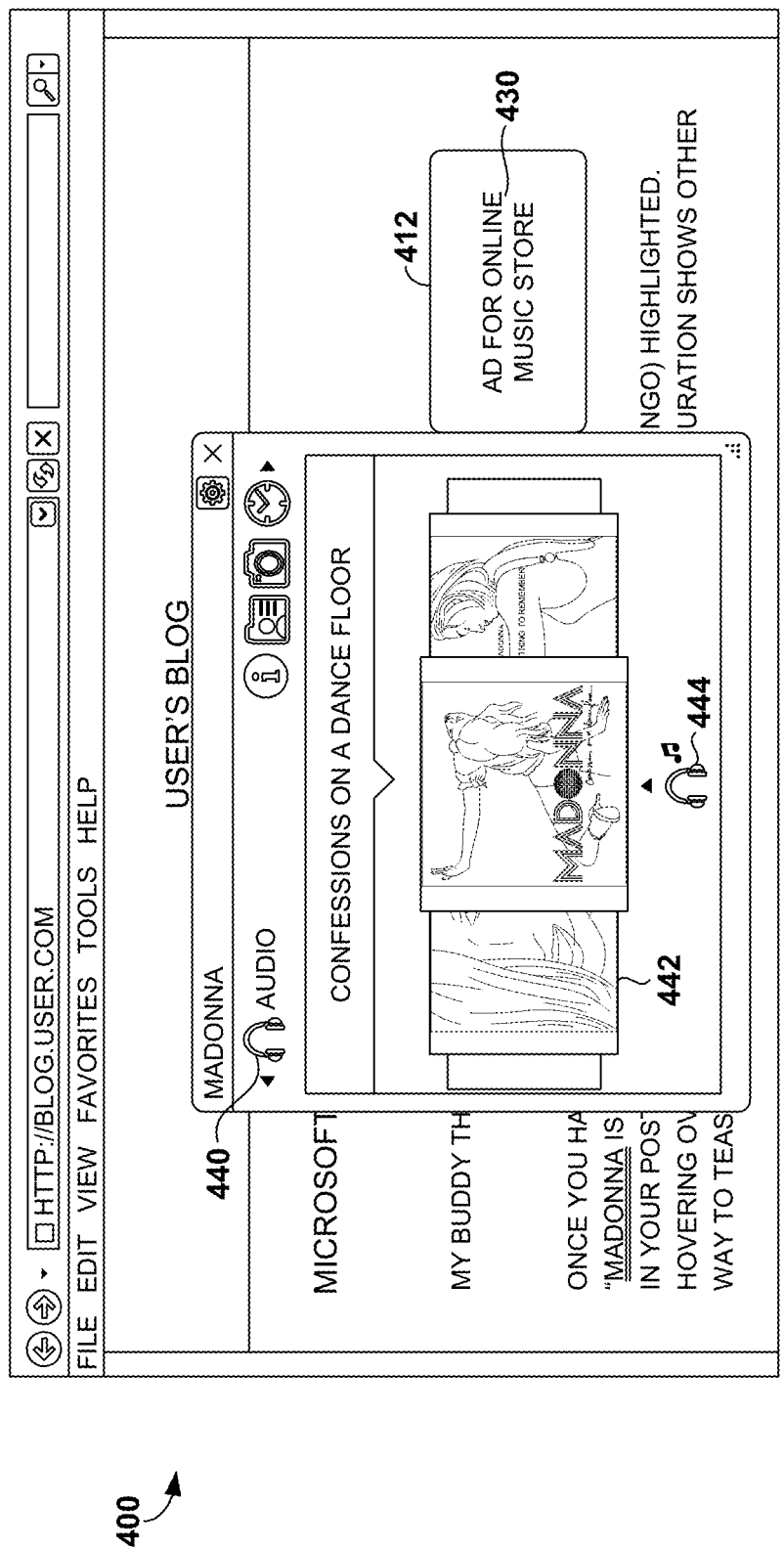

In FIG. 4E, the headphones icon was selected, prompting audio associated with Madonna to be displayed. Specifically, albums 442 are shown, and the web advertisement 430 is switched to an online music store in the second UI display 412. The user can select the second headphones icon 444 to drill down to the songs of an album.

Figure 4F:
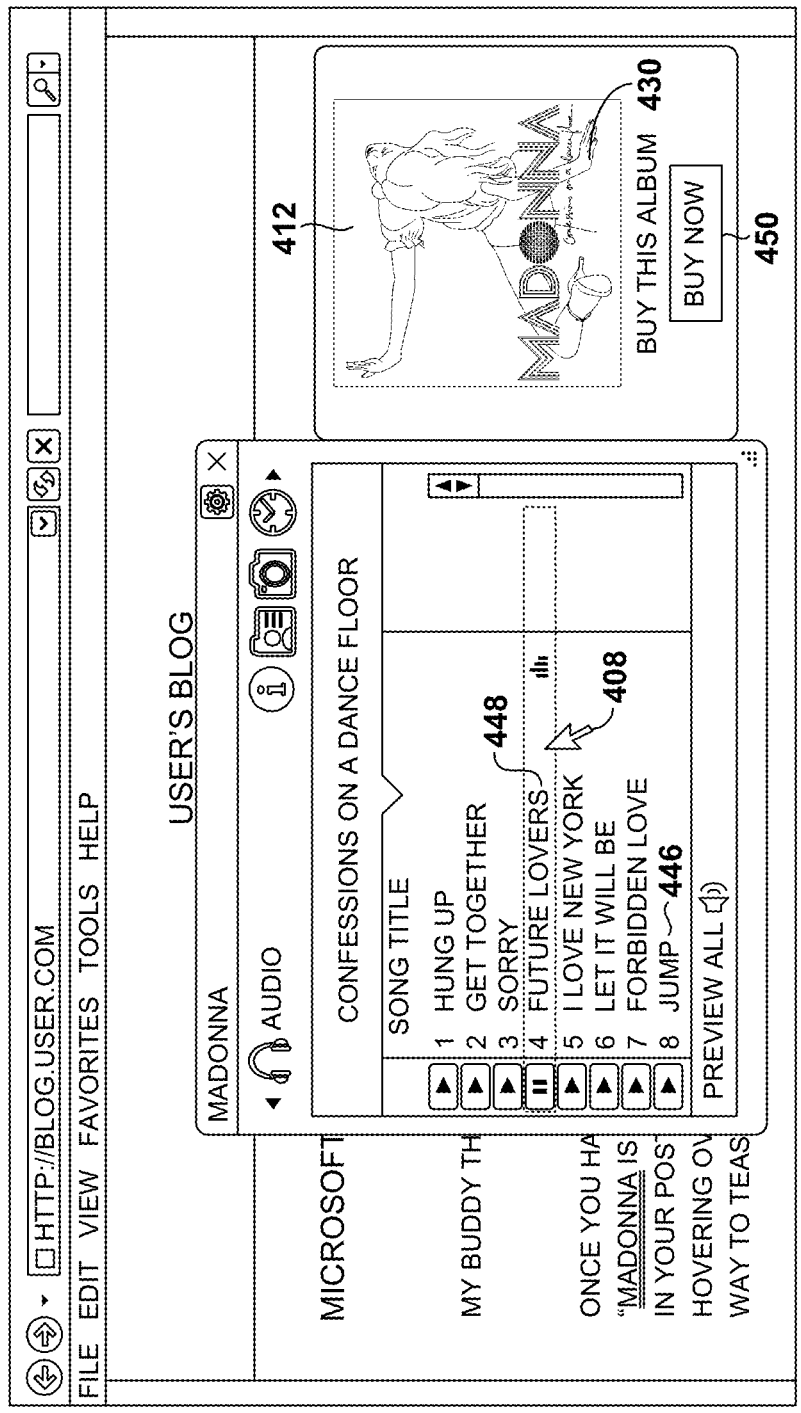

FIG. 4F shows a list of songs 446 in one of the albums 442. The user can select and play a song, such as song 448, using the mouse cursor 408. The web advertisement 430 in the second UI display 412 has switched to display the album selected by the user, and a BUY NOW option 450 allows the user to move towards purchasing the album song.

Figure 4G:
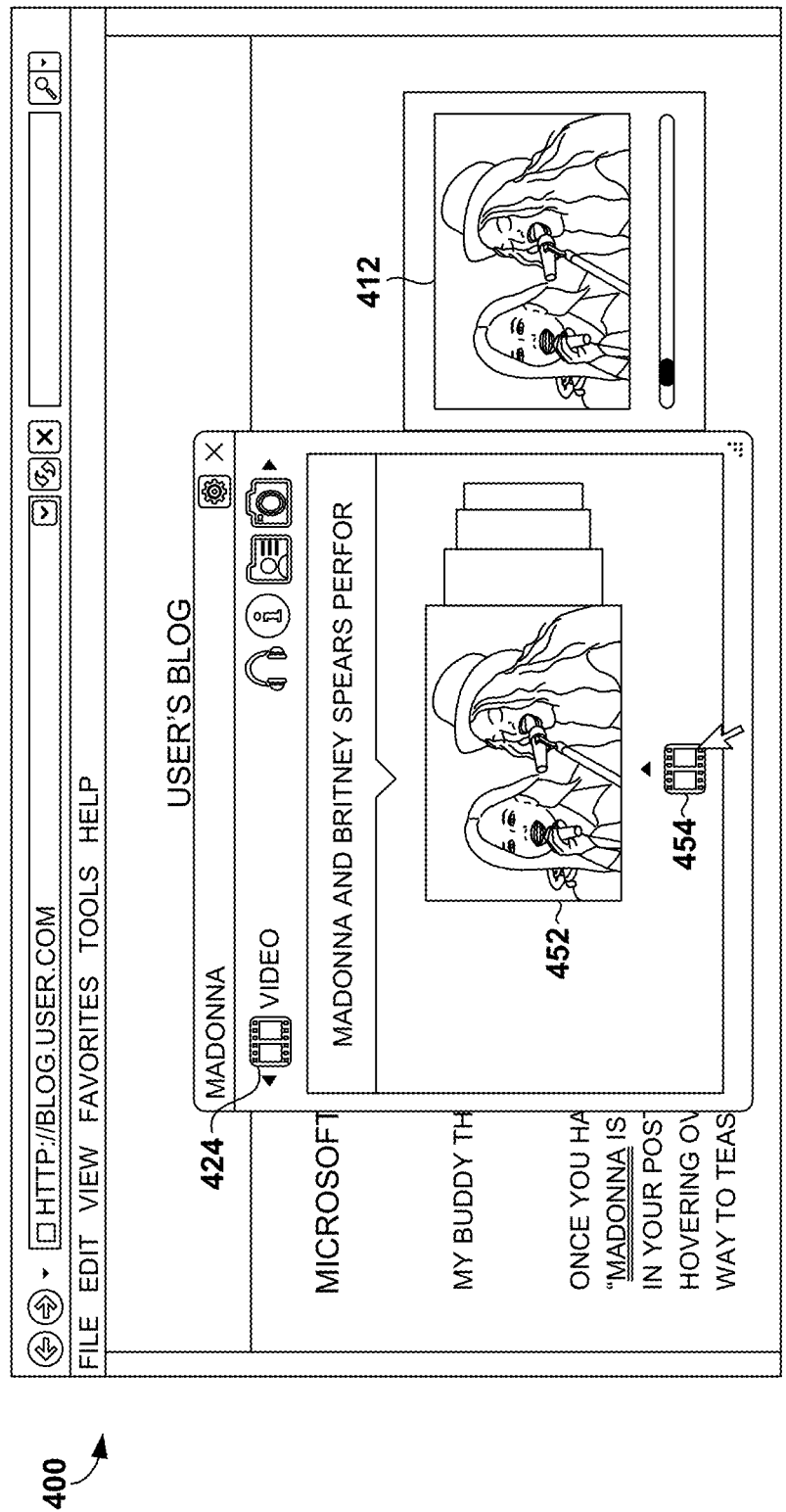

In FIG. 4G, the film icon 424 was selected, prompting online videos 452 about Madonna to be displayed. In one embodiment, the user can play a particular video by selecting icon 454, resulting in the selected video being played in the second UI display 412.

Figure 4H:
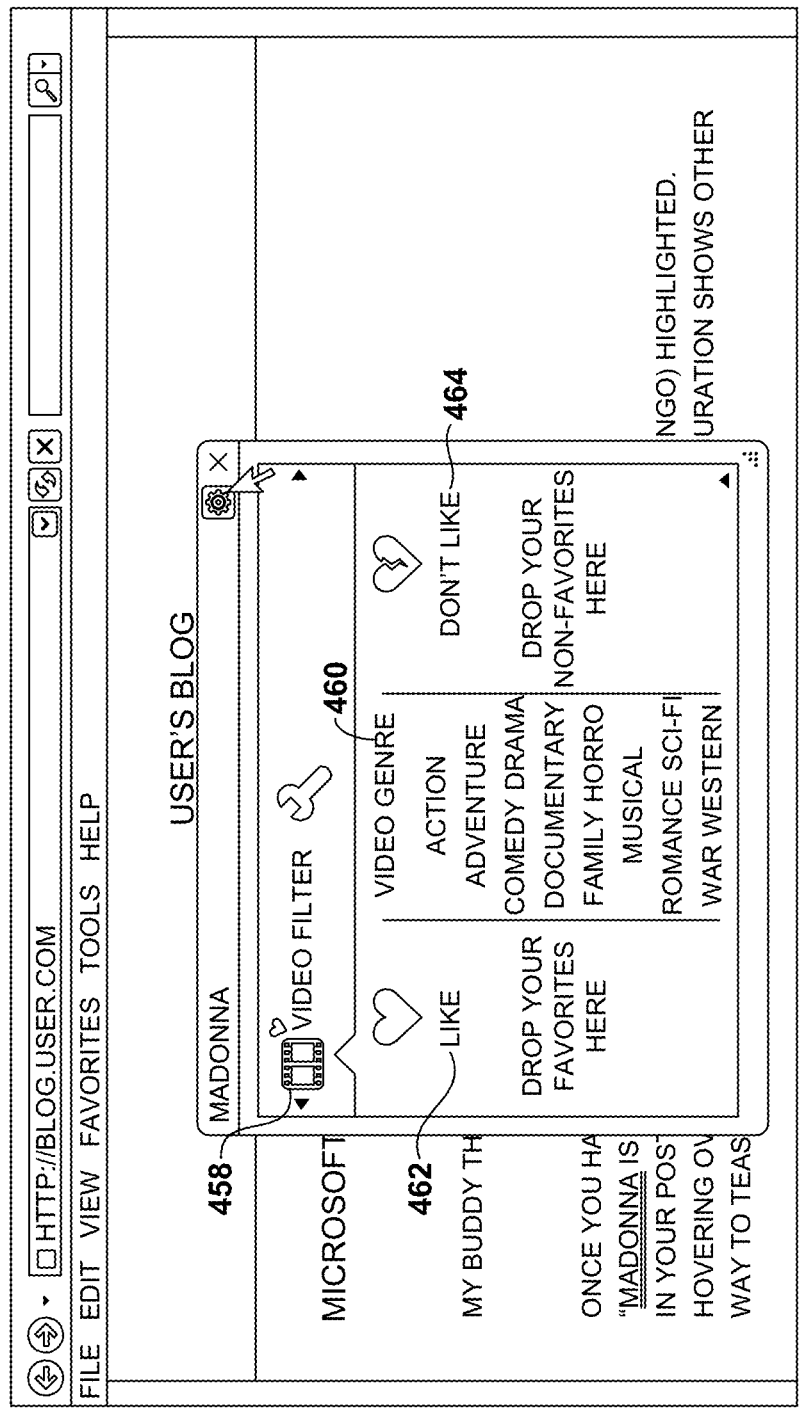

The user can also indicate preferences for the types of web content being presented. FIG. 4H shows an example of a video filter 458 that, when selected, allows the user to indicate a genre 460, likes 462, and dislikes 464. Similar filters may also be applied to other types of web content (e.g., news, audio, profile, etc.).

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. A method for displaying a user-interactive collection of content associated with text on a web page, the method comprising:

accessing an entity database storing a plurality of entity definitions associated with a plurality of text phrases, wherein each entity definition specifies a contextual category associated with a corresponding text phrase;

parsing text on a web page;

identifying entities in the entity database related to the parsed text;

utilizing a geographic location to classify a meaning of text on the web page;
filtering the entities based on the meaning of the text;
providing an indication to visually identify the text on the web page;
receiving an indication of a trigger event from a user;
requesting and receiving web content related to the text;
displaying the web content in a window rendered as an overlay on top of the web page, wherein the window displays options for interacting with the web information; and
adjacent to the UI window, displaying an advertisement window with a web advertisement contextually related to a portion of the web information.

2. The method of claim 1, further comprising using tracking data associated with the user to select the web advertisement for display in the advertisement window.

3. The method of claim 1, wherein the contextual category is related to an entity definition specified by an administrator.

4. The method of claim 1, wherein the text phrase indicates that the text identifies a celebrity.

5. The method of claim 1, wherein the trigger event includes at least one member of a group comprising a mouse selection of the text or a mouse hover over the text.

6. The method of claim 1, wherein the options comprise at least one member of a group comprising:
audio related to the text;
video related to the text;
news highlights related to the text;
a timeline of events associated with the text;
images associated with the text; and
a product associated with the text.

7. The method of claim 6, further comprising:
receiving a user selection of one of the options;
storing a representation of the user and the one of the options selected by the user; and
using the representation to select the web advertisement for display in the advertisement window.

8. The method of claim 1, wherein the UI window displays a toolbar indicating the options.

9. The method of claim 7, wherein the web advertisement is also related to the entity definition corresponding to the text phrase in the entity database related to the text.

10. One or more computer storage media excluding signals per se embodied with computer-executable instructions that, when executed by a processor, perform a method for displaying an advertisement on a screen, the method comprising:
receiving, from a server, based on a geographic location, an indication that text within a web page refers to an entity definition;
identifying entities in an entity database related to the text;
utilizing a geographic location to classify a meaning of text on the web page;
filtering the entities based on the meaning of the text;
displaying the web page;
based on the indication, visually marking the text to emphasize the text;
receiving a trigger event from a user;
based on the trigger event, displaying additional content about the text, and related to the entity definition, in an overlay UI window presented over a portion of the web page; and
displaying a web advertisement in an advertisement UI window positioned adjacent to the overlay UI window, wherein the web advertisement is contextually relevant to the additional content in the overlay UI window.

11. The media of claim 10, further comprising:
displaying a plurality of options viewing different categories of the additional content in the overlay UI window;
receiving a user selection of one of the options; and
storing the user selection of the one of the options.

12. The media of claim 11, further comprising:
batching a plurality of option selections initiated by the user;
transmitting the plurality of option selections to a server for tracking viewing preferences of the user; and
using the plurality of option selections to filter the additional content according to the viewing preferences of the user.

13. The media of claim 10, further comprising:
receiving a user selection of one of the options;
storing a representation of the user and the one of the options selected by the user; and
using the representation to select the web advertisement for display in the advertisement window.

14. The media of claim 10, wherein the entity definition indicates the text refers to a celebrity.

15. The media of claim 10, wherein the options comprise at least one member of a group comprising:
audio related to the text;
video related to the text;
news highlights related to the text;
a timeline of events associated with the text;
images associated with the text; and
a product associated with the text.

16. One or more computer storage media excluding signals per se embodied with computer-executable instructions that, when executed by a processor, perform a method for displaying a web advertisement, comprising:
presenting a web page with a portion of text emphasized to indicate the portion of text relates, based on a geographic location, to an entity;
identifying entities in an entity database related to the portion of text;
utilizing the geographic location to classify a meaning of the portion of text;
filtering the entities based on the meaning of the portion of text;
presenting a first UI display populated with additional content about the portion of text and options for viewing the additional information; and
presenting a second UI display populated with the web advertisement, the web advertisement being contextually relevant to a portion of the additional information, wherein the second UI display visually connects to the first UI display in a seamless manner.

17. The media of claim 16, wherein the seamless manner comprises a notebook type advertisement where the second UI display is animated to slide out of the first UI display.

18. The media of claim 16, wherein the seamless manner comprises a color scheme bordering the first and second UI displays.

19. The media of claim 16, further comprising replacing the web advertisement in the second UI display with a second web advertisement after a user selects an option for viewing the additional information.

20. The media of claim 19, wherein the option comprises selecting an icon for at least one member of a group comprising:
audio related to the portion of text and the entity; and
video related to the portion of text and the entity.

* * * * *